(12) United States Patent
Rémy et al.

(10) Patent No.: US 11,821,811 B2
(45) Date of Patent: Nov. 21, 2023

(54) FLUID MEASUREMENT SYSTEM FOR AN AIRCRAFT GAS TURBINE ENGINE AND METHOD FOR OPERATING SAME

(71) Applicant: Pratt & Whitney Canada Corp., Longueuil (CA)

(72) Inventors: Patrice Rémy, St-Hubert (CA); Christian Bissonnette, Gatineau (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/665,121

(22) Filed: Feb. 4, 2022

(65) Prior Publication Data

US 2023/0251164 A1 Aug. 10, 2023

(51) Int. Cl.
*G01M 15/14* (2006.01)
*G01M 15/02* (2006.01)

(52) U.S. Cl.
CPC ............ *G01M 15/02* (2013.01); *G01M 15/14* (2013.01)

(58) Field of Classification Search
CPC .............................. G01M 15/02; G01M 15/14
USPC ....................................................... 73/112.01
See application file for complete search history.

(56) References Cited

U.S. PATENT DOCUMENTS

| | | | |
|---|---|---|---|
| 3,236,093 A | 2/1966 | Werner | |
| 4,196,390 A * | 4/1980 | Pitkin | F01D 17/06 324/262 |
| 4,605,315 A * | 8/1986 | Kokoszka | F01D 21/003 374/138 |
| 5,185,996 A * | 2/1993 | Smith | F01D 17/02 415/118 |
| 5,349,850 A * | 9/1994 | Young | G02B 6/3624 73/112.01 |
| 5,517,865 A | 5/1996 | Wisler | |
| 5,752,674 A | 5/1998 | Mears | |
| 2007/0006473 A1* | 1/2007 | Schopf | H02K 7/1823 33/558 |
| 2011/0308331 A1* | 12/2011 | Bodin | G01P 3/488 73/862.193 |
| 2016/0084736 A1* | 3/2016 | Schleif | G01D 11/30 73/112.01 |
| 2016/0266009 A1* | 9/2016 | Erlund | G01K 1/14 |
| 2016/0377487 A1* | 12/2016 | Cheung | G01K 1/08 29/611 |
| 2019/0277770 A1* | 9/2019 | Mekala | G01N 21/954 |

(Continued)

FOREIGN PATENT DOCUMENTS

CN 200952962 Y 9/2007
CN 110195716 A 9/2019
(Continued)

OTHER PUBLICATIONS

EP search report for EP23155225.8 dated May 19, 2023.

*Primary Examiner* — Eric S. McCall
(74) *Attorney, Agent, or Firm* — GETZ BALICH LLC

(57) ABSTRACT

A measurement system for an aircraft gas turbine engine includes an instrumentation hub including at least one probe, and a shield hub positioned axially adjacent the instrumentation hub. The instrumentation hub is rotatable about a rotational axis. The shield hub includes at least one shield which is radially aligned with the at least one probe of the instrumentation hub. The shield hub is rotatable about the rotational axis independent of the instrumentation hub.

19 Claims, 7 Drawing Sheets

(56) References Cited

U.S. PATENT DOCUMENTS

2019/0383158 A1* 12/2019 Diwinsky ............... F23N 5/003
2021/0102824 A1*  4/2021 Bahadur ................ G01D 11/02
2023/0054983 A1*  2/2023 Rémy .................. G01K 13/024

FOREIGN PATENT DOCUMENTS

| CN | 107121291 B | 2/2020 |
| CN | 112179667 A | 1/2021 |
| EP | 0878599 B1 | 7/2003 |

* cited by examiner

FLUID MEASUREMENT SYSTEM FOR AN AIRCRAFT GAS TURBINE ENGINE AND METHOD FOR OPERATING SAME

TECHNICAL FIELD

This disclosure relates generally to instrumentation systems for aircraft gas turbine engines and more particularly to fluid measurement systems resistant to icing and fluid ingestion.

BACKGROUND OF THE ART

In various conditions, such as during testing and development, aircraft gas turbine engines may require measurement of operational parameters such as pressures and temperatures of fluids within engine flow paths (e.g., a core flow path, a bypass flow path, etc.). Accordingly, sensor instrumentation such as pressure and temperature "rakes" may be installed within the fluid flow paths to measure the desired fluid parameters. Icing tests may be performed which subject the gas turbine engine to ice, water, sleet, and other materials. To prevent icing and/or fluid ingestion of sensor instrumentation, fixed physical shielding has been used to protect the instrumentation during icing tests. However, this shielding requires operators to enter testing facilities during the performance of an icing test to manually remove the shielding so that the sensor instrumentation can be used to measure gas turbine engine parameters during operation. This shield removal process can be time consuming. Moreover, if too much time elapses before the sensor instrumentation can be used to measure operational parameters of the gas turbine engine, sufficient quantities of ice applied during the icing test may have melted, thereby requiring reperformance of the test. Accordingly, there is a need for improved measurement systems.

SUMMARY

It should be understood that any or all of the features or embodiments described herein can be used or combined in any combination with each and every other feature or embodiment described herein unless expressly noted otherwise.

According to an aspect of the present disclosure, a measurement system for an aircraft gas turbine engine includes an instrumentation hub including at least one probe, and a shield hub positioned axially adjacent the instrumentation hub. The instrumentation hub is rotatable about a rotational axis. The shield hub includes at least one shield which is radially aligned with the at least one probe of the instrumentation hub. The shield hub is rotatable about the rotational axis independent of the instrumentation hub.

In any of the aspects or embodiments described above and herein, the at least one probe may include a probe body and at least one sensor inlet port extends through the probe body. The at least one sensor inlet port may be configured to receive and convey a fluid for measurement.

In any of the aspects or embodiments described above and herein, the shield hub may be configured to engage the instrumentation hub so as to selectively effect rotation of the instrumentation hub about the rotational axis.

In any of the aspects or embodiments described above and herein, the shield hub may be rotatable about the rotational axis between a first rotational position relative to the instrumentation hub and a second rotational position relative to the instrumentation hub. In the first rotational position, the shield hub may be configured to rotate about the rotational axis independent of the instrumentation hub. In the second rotational position, the shield hub may be configured to engage the instrumentation hub such that the shield hub and the instrumentation hub are configured to rotate together about the rotational axis.

In any of the aspects or embodiments described above and herein, in the first rotational position, the at least one shield may be circumferentially aligned with the at least one probe and, in the second rotational position, the at least one shield may be circumferentially offset from the at least one probe.

In any of the aspects or embodiments described above and herein, the instrumentation hub may include a partially-circumferential cam slot. The shield hub may include a cam bolt positioned within the cam slot. The cam bolt may be configured to travel circumferentially within the cam slot as the shield hub rotates between the first rotational position and the second rotational position.

In any of the aspects or embodiments described above and herein, the measurement system may further include a motor connected to the shield hub by a shaft disposed about the rotational axis. The motor may be configured to effect rotation of the shield hub about the rotational axis.

In any of the aspects or embodiments described above and herein, the shaft and the instrumentation hub may be rotatably mounted to a bearing.

In any of the aspects or embodiments described above and herein, the shaft may be rotatably mounted to an inner radial portion of the bearing and the instrumentation hub may be rotatably mounted to an outer radial portion of the bearing.

In any of the aspects or embodiments described above and herein, the measurement system may further include a fixed structure positioned adjacent the instrumentation hub, and an anti-rotation device in contact with the instrumentation hub and the fixed structure. The anti-rotation device may be configured to resist rotation of the instrumentation hub relative to the fixed structure.

In any of the aspects or embodiments described above and herein, the shield hub may include a first outer radial flowpath surface and the at least one shield extends radially outward from the first outer radial flowpath surface. The instrumentation hub may include a second outer radial flowpath surface and the at least one probe extends radially outward from the second outer radial flowpath surface.

In any of the aspects or embodiments described above and herein, the at least one probe may include a plurality of probes circumferentially spaced about the instrumentation hub.

According to another aspect of the present disclosure, a gas turbine engine for an aircraft includes an annular fluid flow path disposed about a longitudinal centerline of the gas turbine engine, an instrumentation hub including at least one probe positioned within the annular fluid flow path, and a shield hub positioned axially adjacent the instrumentation hub. The instrumentation hub is rotatable about the longitudinal centerline. The shield hub includes at least one shield positioned within the annular fluid flow path. The at least one shield is radially aligned with the at least one probe of the instrumentation hub. The shield hub is rotatable about the longitudinal centerline independent of the instrumentation hub.

In any of the aspects or embodiments described above and herein, the annular fluid flow path may be a core flow path of the gas turbine engine.

In any of the aspects or embodiments described above and herein, the annular fluid flow path may be a bypass flow path of the gas turbine engine.

According to another aspect of the present disclosure, a method for operating a measurement system for an aircraft gas turbine engine includes providing a shield hub including at least one shield and an instrumentation hub including at least one probe. The shield hub is positioned axially adjacent the instrumentation hub with respect to a rotational centerline. The method further includes rotating the shield hub relative to the instrumentation hub in a first rotational direction to circumferentially offset the at least one shield from the at least one probe. The method further includes rotating the shield hub and the instrumentation hub in the first rotational direction. The method further includes measuring, with the at least one probe, fluid flow parameters of a fluid flow within a fluid flow path of the gas turbine engine while rotating the shield hub and the instrumentation hub in the first rotational direction.

In any of the aspects or embodiments described above and herein, the method may further include performing an icing test with the at least one shield circumferentially aligned with the at least one probe, prior to the step of rotating the shield hub relative to the instrumentation hub in the first rotational direction.

In any of the aspects or embodiments described above and herein, the method may further include rotating the shield hub relative to instrumentation hub in a second rotational direction, opposite the first rotational direction, until the at least one shield is circumferentially aligned with the at least one prior, subsequent to the step of rotating the shield hub and the instrumentation hub in the first rotational direction to measure fluid flow within a fluid flow path of the gas turbine engine.

In any of the aspects or embodiments described above and herein, the step of rotating the shield hub relative to the instrumentation hub in a first rotational direction may include rotating the shield hub with a motor connected to the shield hub by a shaft.

In any of the aspects or embodiments described above and herein, the shaft and the instrumentation hub may be rotatably mounted to a bearing. The shaft may be rotatably mounted to an inner radial side of the bearing. The instrumentation hub may be rotatably mounted to an outer radial side of the bearing.

The present disclosure, and all its aspects, embodiments and advantages associated therewith will become more readily apparent in view of the detailed description provided below, including the accompanying drawings.

DETAILED DESCRIPTION

Figure 1:
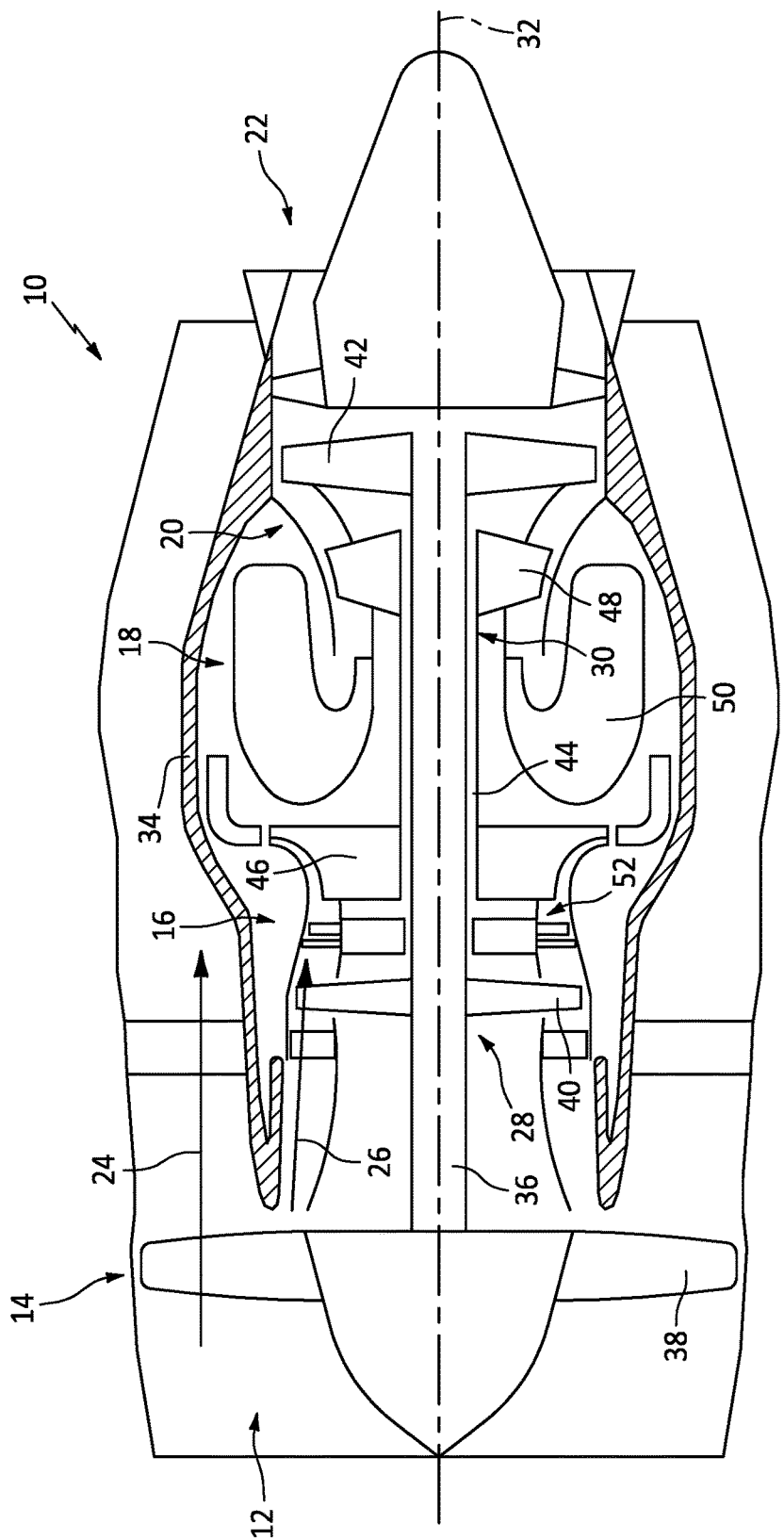
FIG. 1 illustrates a side cross-sectional view of a gas turbine engine, in accordance with one or more embodiments of the present disclosure.

Referring to FIG. 1, an exemplary gas turbine engine 10 is schematically illustrated. The gas turbine engine 10 is disclosed herein as a two-spool turbofan engine that generally includes an inlet 12, a fan section 14, a compressor section 16, a combustor section 18, a turbine section 20, and an exhaust section 22. The fan section 14 drives air along a bypass flow path 24 while the compressor section 16 drives air along a core flow path 26 for compression and communication into the combustor section 18 and then expansion through the turbine section 20. Although depicted as a turbofan gas turbine engine in the disclosed non-limiting embodiments, it should be understood that the concepts described herein are not limited to use with turbofans as the teachings may be applied to other types of gas turbine engines including those with single-spool or three-spool architectures. Moreover, aspects of the present disclosure are not limited in application to gas turbine engines and may be applicable to other aircraft propulsion systems as well.

The gas turbine engine 10 of FIG. 1 includes a low-pressure spool 28 and a high-pressure spool 30 mounted for rotation about a longitudinal centerline 32 (e.g., a rotational axis) of the gas turbine engine 10 relative to an engine static structure 34 (e.g., an engine case). The low-pressure spool 28 includes a low-pressure shaft 36 that interconnects a fan 38, a low-pressure compressor 40, and a low-pressure turbine 42. The high-pressure spool 28 includes a high-pressure shaft 44 that interconnects a high-pressure compressor 46 and a high-pressure turbine 48. It is to be understood that "low pressure" and "high pressure" or variations thereof as used herein are relative terms indicating that the high pressure is greater than the low pressure. An annular combustor 50 is disposed between the high-pressure compressor 46 and the high-pressure turbine 48 along the longitudinal centerline 32. The low-pressure shaft 36 and the high-pressure shaft 44 are concentric and rotate about the longitudinal centerline 32.

Airflow along the core flow path 26 is compressed by the low-pressure compressor 40, then the high-pressure compressor 46, mixed and burned with fuel in the combustor 50, and then expanded over the high-pressure turbine 48 and the low-pressure turbine 42. The low-pressure turbine 42 and the high-pressure turbine 48 rotationally drive the low-pressure spool 28 and the high-pressure spool 30, respectively, in response to the expansion.

During gas turbine engine operation, development, testing, and/or certification, it may be necessary to measure fluid flow parameters, such as fluid pressure, fluid temperature, fluid flow velocity, fluid flow swirl, etc., inside one or more fluid (e.g., air or other gas) flow paths of the gas turbine engine. Fluid flow parameters may be measured at various stages of a gas turbine engine such as the gas turbine engine 10. For example, fluid flow parameters may be measured within fluid flow paths located in portions of the gas turbine engine 10 such as, but not limited to, the inlet 12, the compressor section 16 including various stages of the compressors 40, 46, the exhaust section 22, and other portions of the gas turbine engine 10 along the core flow path 26 and/or the bypass flow path 24. The gas turbine engine 10 includes at least one measurement system 52 configured to measure fluid flow parameters within a respective fluid flow path of the gas turbine engine 10. The gas turbine engine of FIG. 1 includes the measurement system 52 located axially between the low-pressure compressor 40 and the high-pressure compressor 46 to measure fluid flow parameters along the core flow path 26. However, the present disclosure is not limited to the location of the measurement system 52 illustrated in FIG. 1.

Figure 3:
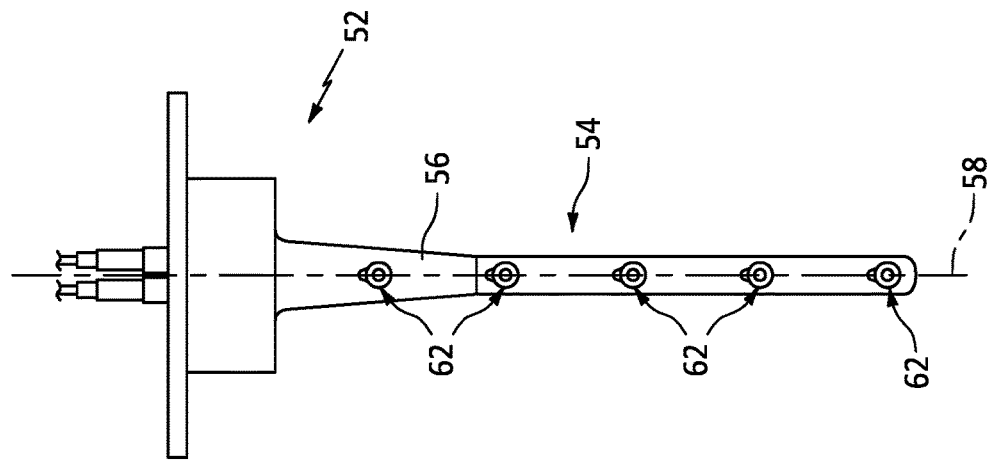
FIG. 3 illustrates a front view of the pressure of FIG. 2, in accordance with one or more embodiments of the present disclosure.
Figure 2:
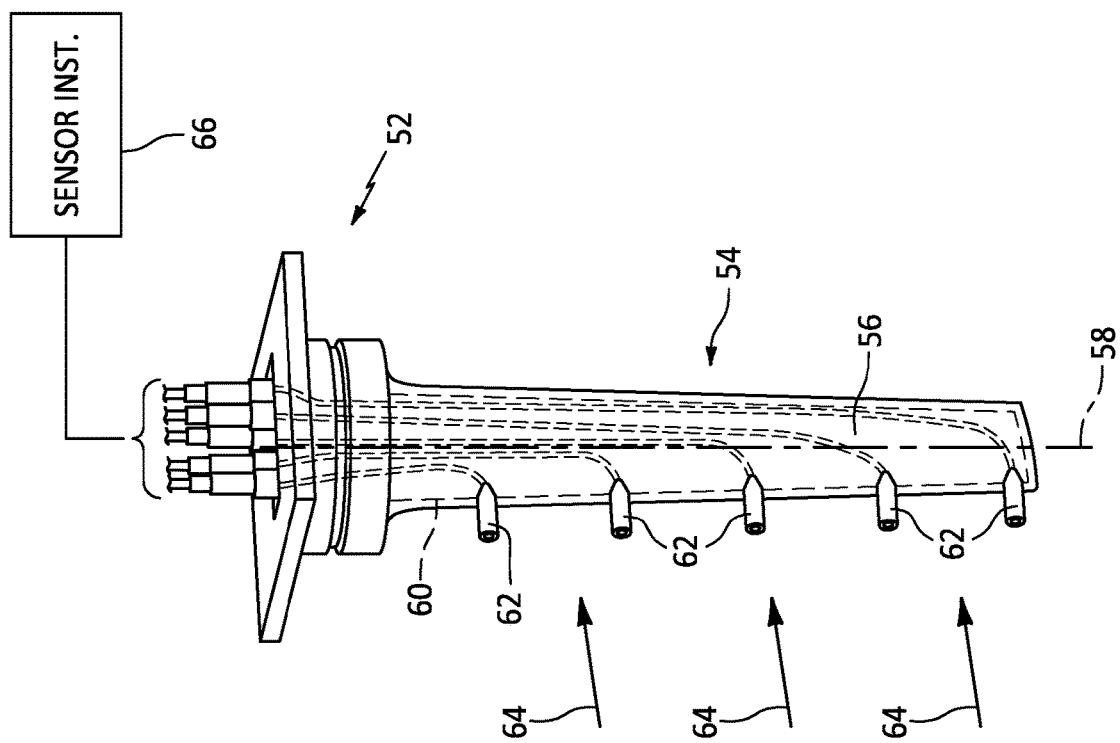
FIG. 2 illustrates perspective view of a probe, in accordance with one or more embodiments of the present disclosure.

Referring to FIGS. 1-3, the measurement system 52 includes one or more probes 54 disposed in a fluid flow path (e.g., the core flow path 26) of the gas turbine engine 10 to sample fluid (e.g., sensed fluid flow) within the fluid flow path. A non-limiting example of a probe 54 for the measurement system 52 is shown in FIGS. 2 and 3. The probe 54 includes a probe body 56 extending lengthwise along a probe axis 58. The probe body 56 defines an internal cavity 60 of the probe 54. The probe 54 may be used to measure a total pressure (sometimes referred to as "stagnation pressure" or "pitot pressure") of the fluid within the fluid flow path. Constituents of total pressure, such as the static pressure and the dynamic pressure (also known as "velocity pressure") of the fluid, may additionally be determined using the probe 54.

The pressure probe 54 of FIGS. 2 and 3 includes a plurality of sensor inlet ports 62 extending through the probe body 56. The probe 54 may be configured as a "rake" with the plurality of sensor inlet ports 62 axially spaced along the probe axis 58. In some embodiments, the plurality of sensor inlet ports 62 may be substantially aligned with a fluid flow direction (schematically illustrated in FIG. 2 as the flow direction 64) of the fluid traversing the fluid flow path. In other words, the plurality of sensor inlet ports 62 may face a common fluid flow direction. In some embodiments, the plurality of sensor inlet ports 62 may face different directions from one another depending, for example, on the expected fluid flow direction 64 of the fluid traversing the fluid flow path. For example, where the fluid experiences vorticity or rotation along the fluid flow path such that the fluid flow direction 64 varies, the plurality of sensor inlet ports 62 may be configured to face different directions to accommodate the varying fluid flow direction 214. In some embodiments, the plurality of sensor inlet ports 62 may be configured as Pitot probes (also known as a "Pitot tubes"). The sensor inlet ports may be configured as Kiel probes, which are a variation of the Pitot probes having an inlet protected by a "shroud," thereby making the Kiel probe configuration less sensitive to changes in yaw angle. Accordingly, the Kiel probe configuration may be more useful when the sensor inlet port alignment with the fluid flow direction 64 is variable or imprecise, for example, in comparison to conventional Pitot probe configurations. However, the present disclosure is not limited to any particular configuration of the plurality of sensor inlet ports 62.

The measurement system 52 includes sensor instrumentation 66 in fluid communication with the plurality of sensor inlet ports 62. The sensor instrumentation 66 is configured to receive the sensed fluid flow (illustrated in FIG. 2 as sensed fluid flow 68) and to calculate one or more sensed fluid flow measurements such as, but not limited to, total pressure, static pressure, dynamic pressure, fluid flow velocity, fluid temperature, etc. The sensor instrumentation 66 of FIG. 2 is located outside of the probe 54. The sensor instrumentation 66 may be located internal or external to the gas turbine engine 10.

Development and/or testing of a gas turbine engine, such as the gas turbine engine 10, may include one or more testing phases which include the measurement of fluid flow parameters within one or more fluid flow paths of the gas turbine engine. Fluid flow parameters may be measured, for example, by the measurement system 52 within annular fluid flow paths such as the bypass flow path 24 or the core flow path 26 of the gas turbine engine 10. The aforementioned testing phases may include testing the gas turbine engine 10 under icing conditions. An icing test may include the application of ice, water, sleet, and/or exposure to other fluids or foreign matter (e.g., within a controlled test environment such as a laboratory, testing cell, etc.) under conditions which may cause ice to form on the exterior and/or interior of the gas turbine engine 10. The gas turbine engine 10 may be subsequently operated to measure fluid flow parameters of the gas turbine engine 10 with the measurement system 52 under the pre-established icing conditions. However, the accumulation of ice, water, sleeve, and/or other fluids or foreign matter on or within the one or more probes 54 can negatively impact the performance of the measurement system 52.

Figure 4:
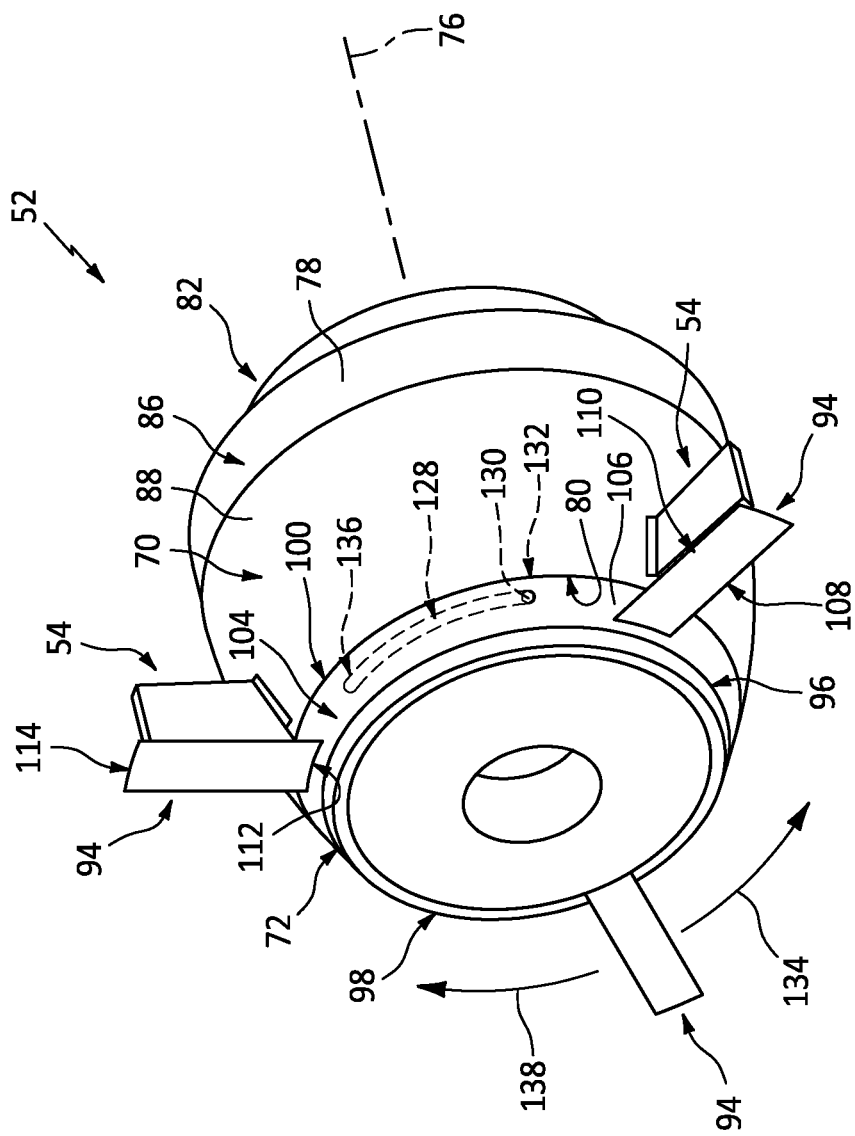
FIG. 4 illustrates a perspective view of a measurement system, in accordance with one or more embodiments of the present disclosure.
Figure 5:
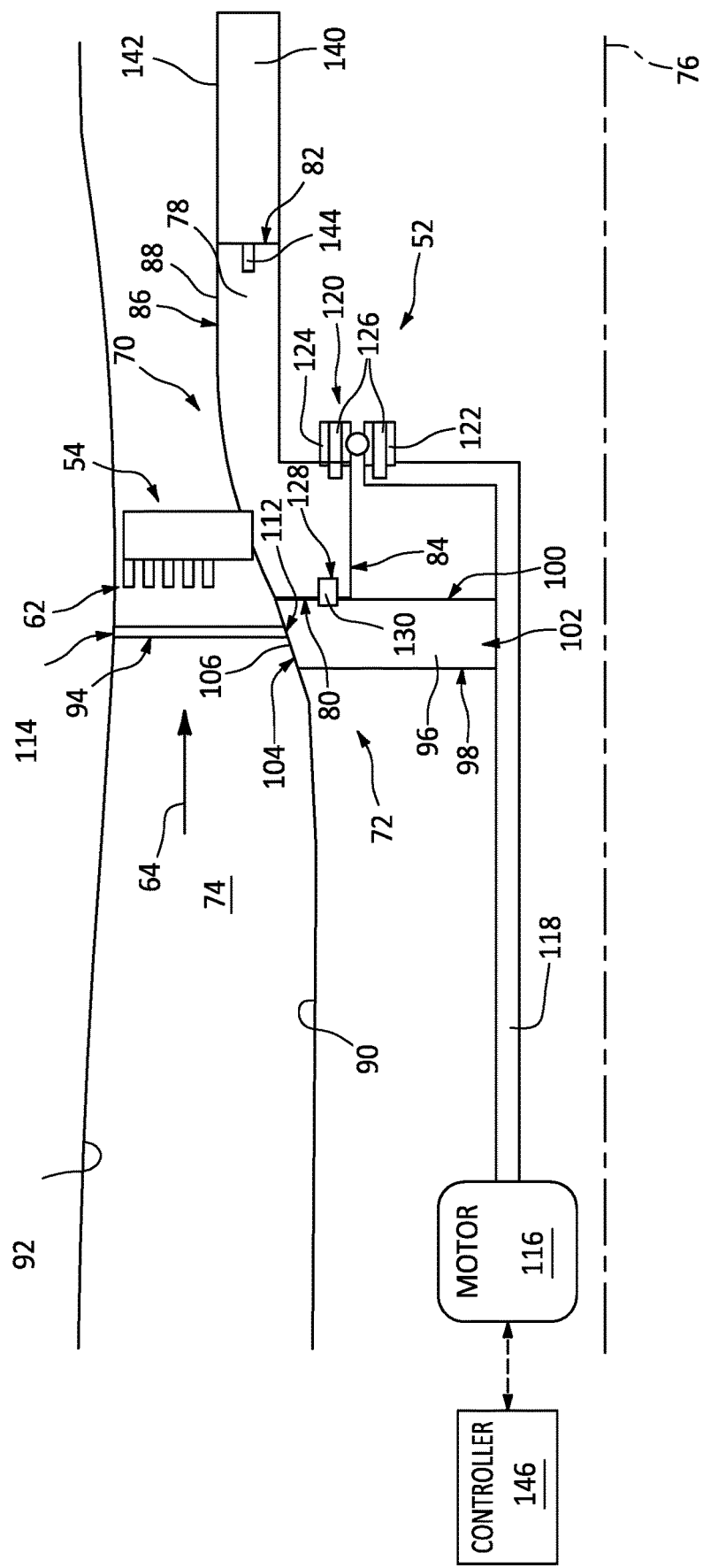
FIG. 5 illustrates a schematic cross-sectional view of the measurement system of FIG. 4 taken along Line 5-5, in accordance with one or more embodiments of the present disclosure.

Referring to FIGS. 4 and 5, the measurement system 52 includes an instrumentation hub 70 and a shield hub 72. FIG. 4 illustrates a perspective view of the instrumentation hub 70 and the shield hub 72. FIG. 5 illustrates a schematic cross-sectional view of the instrumentation hub 70 and the shield hub 72 positioned relative to an annular fluid flow path 74 of the gas turbine engine 10. The fluid flow path 74 may include, for example, the bypass flow path 24 and/or the core flow path 26 of the gas turbine engine 10 (see FIG. 1). However, the present disclosure fluid flow path 72 is not limited to the bypass flow path 24 or the core flow path 26. The fluid flow path 74 includes and is defined between an inner radial flow path surface 90 and an outer radial flow path surface 92.

The instrumentation hub 70 includes one or more probes 54 positioned within the fluid flow path 74. The instrumentation hub 70 of FIGS. 4 and 7-9 is illustrated with three probes 54, however, the present disclosure instrumentation hub 70 is not limited to any particular number of probes 54. The instrumentation hub 70 is rotatable about a rotational axis 76 such that the probes 54 are configured to measure fluid flow parameters along the entire circumferential extent of the fluid flow path 74 with respect to the rotational axis 76. The rotational axis 76 may or may not be co-axial with the longitudinal centerline 32 of the gas turbine engine 10 (see FIG. 1). The plurality of sensor inlet ports 62 for each of the probes 54 may be oriented within the fluid flow path 74 to face the fluid flow direction 64 of the fluid traversing the fluid flow path 74.

The instrumentation hub 70 of FIGS. 4 and 5 includes an annular body 78 including a first axial end 80 and a second axial end 82 opposite the first axial end 80. The annular body 78 further includes an inner radial side 84 facing the rotational axis 76 and an outer radial side 86 opposite the inner radial side 84. The annular body 78 includes an outer radial surface 88 located along the outer radial side 86 of the annular body 78. The outer radial surface 88 may define a portion of the fluid flow path 74 between the first axial end 80 and the second axial end 82 of the annular body 78. In other words, the outer radial surface 88 of the annular body 78 may form a portion of the inner radial flow path surface 90. Each of the probes 54 extends radially outward from the outer radial surface 88 into the fluid flow path 74.

The shield hub 72 includes one or more shields 94 positioned within the fluid flow path 74. Each shield 94 of the shield hub 72 is configured to be aligned with a respective probe 54 of the instrumentation hub 70 to protect (e.g., to shield) the respective probe 54 from ice, water, sleet, and/or other fluids or foreign matter during an icing test for the gas turbine engine 10. The shield hub 72 of FIGS. 4 and 7-9 is illustrated with three shields 54, however, the present disclosure shield hub 72 is not limited to any particular number of shields 94. The shield hub 72 is rotatable about the rotational axis 76 such that the shields 94 may move along the entire circumferential extent of the fluid flow path 74 with respect to the rotational axis 76.

The shield hub 72 of FIGS. 4 and 5 includes an annular body 96 disposed axially adjacent the annular body 78 of the instrumentation hub 70. The annular body 96 of the shield hub 72 includes a first axial end 98 and a second axial end 100 opposite the first axial end 98. The annular body 96 further includes an inner radial side 102 facing the rotational axis 76 and an outer radial side 104 opposite the inner radial side 102. The annular body 78 includes an outer radial surface 106 located along the outer radial side 104 of the annular body 96. The outer radial surface 106 may define a portion of the fluid flow path 74 between the first axial end 98 and the second axial end 100 of the annular body 96. In other words, the outer radial surface 106 of the annular body 96 may form a portion of the inner radial flow path surface 90. Each of the shields 94 extends radially outward from the outer radial surface 106 into the fluid flow path 74.

Each shield 94 extends between a first circumferential end 108 and a second circumferential end 110 opposite the first circumferential end 108. Each shield 94 further extends between a first radial end 112 and a second radial end 114 opposite the first radial end 112. The first radial end 112 of each shield 94 is mounted to the shield hub 72. For example, the first radial end 112 of each shield may by mounted to the outer radial surface 106 of the annular body 96 of the shield hub 72. The second radial end 114 of each shield 94 is positioned proximate the outer radial flow path surface 92 of the fluid flow path 74. Accordingly, each shield 94 may radially extend substantially all of a radial distance between the inner radial flow path surface 90 and the outer radial flow path surface 92 of the fluid flow path 74. The shields 94 are positioned to be radially aligned with the probes 54 of the instrumentation hub 70. In other words, the shields 94 are positioned to at least partially radially overlap the probes 54. The shields 94 of FIG. 5 are positioned to radially encompass the probes 54 (e.g., the radial span of the probes 54 is entirely within the radial span of the shields 94), however, the present disclosure is not limited to this particular radial relationship between the shields 94 and the probes 54.

The measurement system 52 includes a motor 116. The motor 116 is connected to the shield hub 72 by a shaft 118. The shaft 118 of FIG. 5 is connected to the inner radial side 102 of the annular body 96 of the shield hub 72, however, the present disclosure is not limited to this particular configuration of the shaft 118 and the shield hub 72. The motor 116 is configured to effect rotation of the shield hub 72 about the rotational axis 76 via the shaft 118. As shown in FIG. 5, the motor 116 may be positioned axially forward of the shield hub 72. However, the motor 116 may have any suitable position and/or orientation relative to the shield hub 72 as necessary to accommodate various gas turbine engine configurations.

The measurement system 52 includes a bearing 120. The bearing 120 may be an annular bearing disposed about the rotational axis 76. For example, the bearing 120 may be a turntable bearing (sometimes referred to as a "slewing ring bearing") having an inner ring and an outer ring which are rotatable relative to one another (e.g., about the rotational axis 76). The shaft 118 is mounted to an inner radial portion 122 (e.g., an inner ring) of the bearing 120. The instrumentation hub 70 is mounted to an outer radial portion 124 (e.g., an outer ring) of the bearing 120. The shaft 118 and the instrumentation hub 70 may be mounted to the respective inner radial portion 122 and outer radial portion 124, for example, by a plurality of fasteners 126.

Referring to FIGS. 4-7, the shield hub 72 is configured to engage the instrumentation hub 70. As described above, the motor 116 is connected to the shield hub 72 by the shaft 118 which permits the motor 116 to rotate the shield hub 72 relative to the rotational axis 76. Engagement between the shield hub 72 and the instrumentation hub 70 imparts the rotation of the shield hub 72, applied by the motor 116, to the instrumentation hub 70. Accordingly, the shield hub 72 is configured to engage the instrumentation hub 70 so as to selectively effect rotation of the instrumentation hub 70 about the rotational axis 76, thereby permitting co-rotation of the shield hub 72 and the instrumentation hub 70 by the motor 116.

Figure 7:
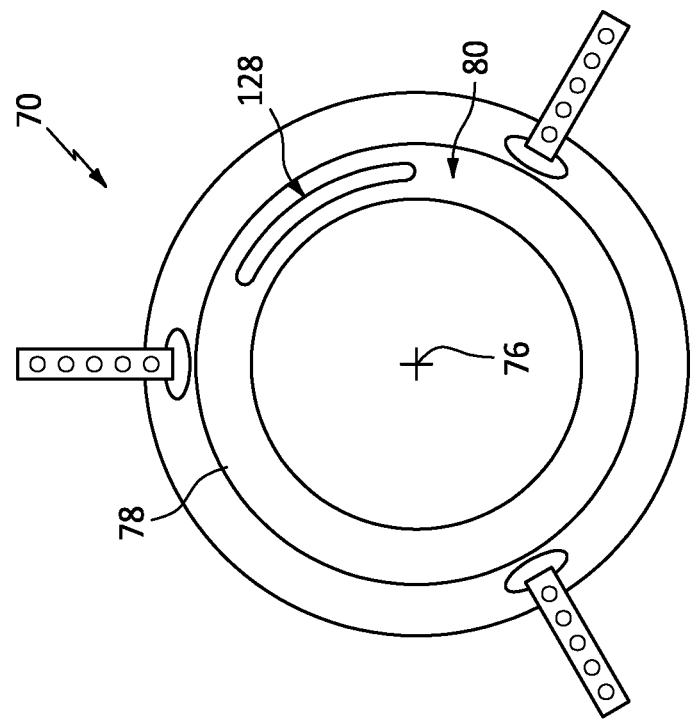
FIG. 7 illustrates a forward view of a portion of the measurement system of FIG. 4, in accordance with one or more embodiments of the present disclosure.
Figure 6:
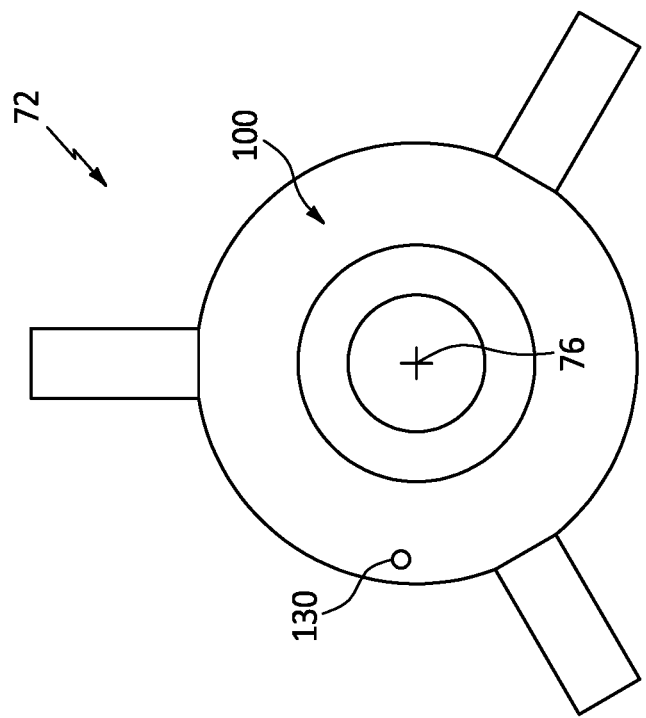
FIG. 6 illustrates an aft view of a portion of the measurement system of FIG. 4, in accordance with one or more embodiments of the present disclosure.

In one non-limiting example, the instrumentation hub 70 includes a cam slot 128 and the shield hub 72 includes a cam bolt 130 positioned within the cam slot 128, as shown in FIG. 5. The cam slot 128 of FIGS. 5 and 7 is located on the first axial end 80 of the annular body 78 of the instrumentation hub 70. The cam slot 128 is a partially-circumferential cam slot which extends about only a portion of the rotational axis 76 along the annular body 78. For example, the cam slot 128 may extend less than 90 degrees about the rotational axis 76 along the annular body 78. However, the present disclosure is not limited to any particular circumferential extent of the cam slot 128. The cam bolt 130 of FIGS. 5 and 6 is located on the second axial end 100 of the annular body 96 of the shield hub 72. The cam bolt 130 projects axially outward from the second axial end 100 into the cam slot 128 defined by the annular body 78 of the instrumentation hub 70. The cam bolt 130 and the cam slot 128 are configured such that the cam bolt 130 may travel circumferentially within the cam slot 128, between a plurality of rotational positions, as the shield hub 72 rotates relative to the instrumentation hub 70 about the rotational axis 76.

As shown in FIG. 4, each of the shields 94 is circumferentially aligned with a respective one of the probes 54 to protect the probes 54 during an icing test in which ice, water, sleet, and/or other fluids or foreign matter may be directed into the fluid flow path 74. The cam bolt 130 of FIG. 4 is located in a first rotational position (e.g., the first rotational position 132 illustrated in FIG. 4) within the cam slot 128. An initial rotation of the shield hub 72 in a rotational direction 134 will cause the shield hub 72 to rotate relative to the instrumentation hub 70 about the rotational axis 76. Accordingly, the shield hub 72 may rotate in the rotational direction 134 independent of the instrumentation hub 70 as the cam bolt 130 travels between the first rotational position 132 and a second rotational position (e.g., the second rotational position 136 illustrated in FIG. 4) within the cam slot 128. In other words, rotation of the shield hub 72 by the motor 116 will not cause rotation of the instrumentation hub 70 as the cam bolt 128 travels between the first rotational position 132 and the second rotational position 136 in the rotational direction 134. With the cam bolt 128 in the second rotational position 136, further rotation of the shield hub 72 will cause the cam bolt 128 to circumferentially contact the annular body 78 of the instrumentation hub 70, thereby causing the instrumentation hub 70 to rotate (e.g., co-rotate with the shield hub 72) about the rotational axis 76 in the rotational direction 134. As will be discussed in further detail below, with the cam bolt 128 of the shield hub 72 in the first rotational position 132 relative to the instrumentation hub 70, each of the shields 94 is circumferentially aligned with a respective one of the probes 54. With the cam bolt 128 of the shield hub 72 in the second rotational position 136 relative to the instrumentation hub 70, each of the shields 94 is circumferentially offset from the respective one of the probes 54.

Similarly, the shield hub 72 may rotate in a rotational direction 138 (opposite the rotational direction 134) independent of the instrumentation hub 70 as the cam bolt 130 travels between the second rotational position 136 and the first rotational position 132 within the cam slot 128. In other words, rotation of the shield hub 72 by the motor 116 will not cause rotation of the instrumentation hub 70 as the cam bolt 128 travels between the second rotational position 136 and the first rotational position 132 in the rotational direction 138. With the cam bolt 128 in the first rotational position 132, further rotation of the shield hub 72 will cause the cam bolt 128 to circumferentially contact the annular body 78 of the instrumentation hub 70, thereby causing the instrumentation hub 70 to rotate (e.g., co-rotate with the shield hub 72) about the rotational axis 76 in the rotational direction 138.

Referring to FIG. 5, the gas turbine engine 10 may include a fixed structure 140 (e.g., a rotationally fixed structure relative to the rotational axis 76) axially adjacent the instrumentation hub 70. The fixed structure 140 may be configured as or otherwise include portions of an engine case or cowling of the gas turbine engine 10. The fixed structure 140 may include an outer radial surface 142 which may define a portion of the fluid flow path 74 (e.g., the outer radial surface 142 may form a portion of the inner radial flow path surface 90).

In some embodiments, the measurement system 52 may include an anti-rotation device 144 configured to resist or prevent rotation of the instrumentation hub 70 relative to the fixed structure 140 about the rotational axis 76. The anti-rotation device 144 may, therefore, prevent undesired rotation of the instrumentation hub 70 relative to the shield hub 72. For example, with the shields 94 circumferentially aligned with the probes 54 to protect the probes 54 during an icing test, the anti-rotation device 144 may prevent fluid flow within the fluid flow path 74 from imparting rotation on the instrumentation hub 70, thereby causing the probes 54 to become circumferentially offset from the shields 94. Similarly, with the shields 94 circumferentially offset from the probes 54 with the probes 54 measuring fluid flow parameters within the fluid flow path 74, the anti-rotation device 144 may prevent fluid flow within the fluid flow path 74 from imparting rotation on the instrumentation hub 70, thereby causing the probes 54 to become circumferentially aligned with (e.g., obstructed by) the shields 94. As shown in FIG. 5, the anti-rotation device 144 may be one or more spring plungers mounted to the fixed structure 140 and axially biased against the second axial end 82 of the annular body 78 of the instrumentation hub 70. However, the present disclosure is not limited to this particular configuration of the anti-rotation device 144.

In some embodiments, the measurement system 52 may include a controller 146. The controller 146 may be in signal communication with the pressure sensor motor 116 and/or the probes 54. In some embodiments, the controller 146 may include the sensor instrumentation 66. The controller 146 may include any type of computing device, computational circuit, or any type of process or processing circuit capable of executing a series of instructions that are stored in memory. For example, the controller 146 may be configured to execute control program code directed to the operation of the motor 116 and/or sensor instrumentation 66. The controller 146 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory may represent one or more algorithms for controlling the aspects of the gas turbine engine 10, and the stored instructions are not limited to any particular form (e.g., program files, system data, buffers, drivers, utilities, system programs, etc.) provided they can be executed by the controller 146. The memory may be a non-transitory computer readable storage medium configured to store instructions that when executed by one or more processors, cause the one or more processors to perform or cause the performance of certain functions. The memory may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 146 may be achieved via the use of hardware, software, firmware, or any combination thereof. The controller 146 may include input and output devices (e.g., a keyboard, a touch screen, etc.) that enable the operator to input and/or receive instructions or data.

Figure 8:
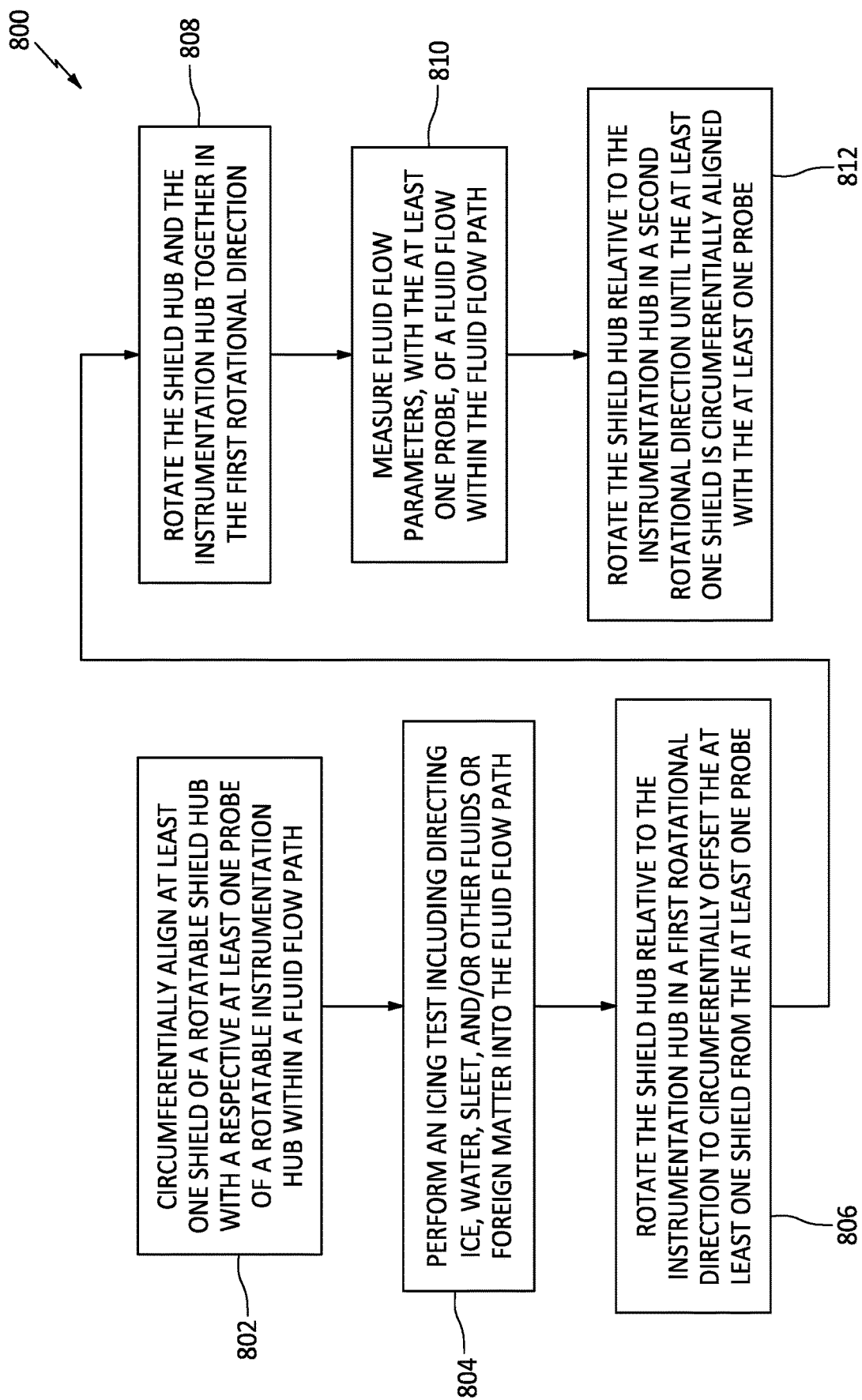
FIG. 8 illustrates a flowchart of a method for operating a measurement system, in accordance with one or more embodiments of the present disclosure.
Figure 10:
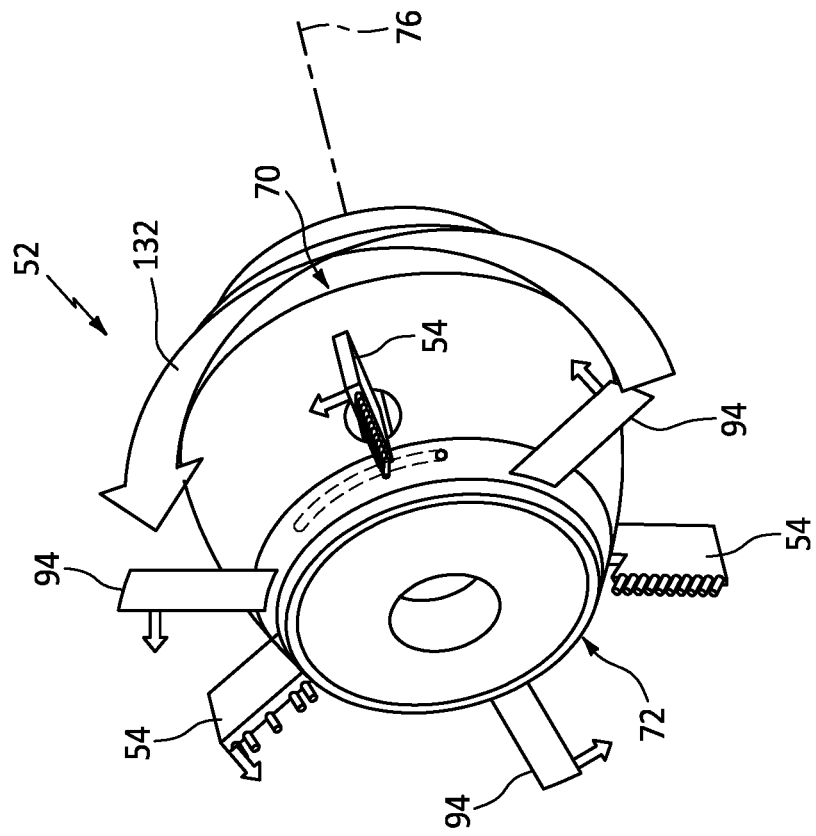
FIG. 10 illustrates a perspective view of the measurement system of FIG. 4, in accordance with one or more embodiments of the present disclosure.
Figure 9:
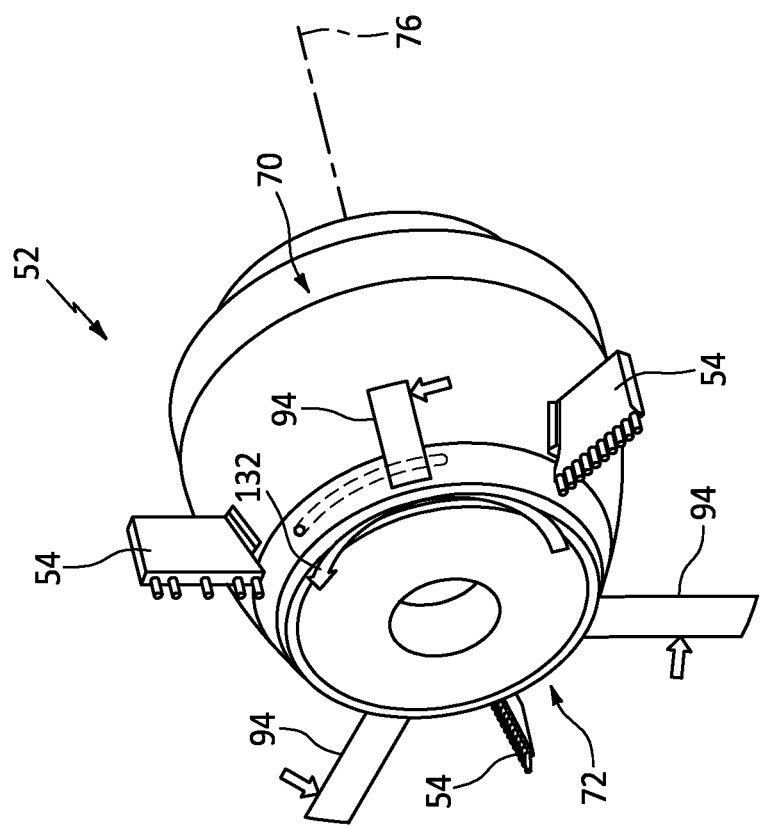
FIG. 9 illustrates a perspective view of the measurement system of FIG. 4, in accordance with one or more embodiments of the present disclosure.

Referring to FIGS. 4 and 8-10, a method for operating a measurement system is provided. FIG. 8 illustrates a flowchart of the method 800. The method 800 may be performed using a measurement system such as, but not limited to, the measurement system 52 of FIGS. 4-7. The controller 146 may be configured to execute one or more steps of the method 800. However, the present disclosure method 800 is not limited to use with the measurement system 52 or controller 146. FIGS. 9 and 10 illustrate the measurement system 52 of FIG. 4 during various steps of the method 800. Unless otherwise noted herein, it should be understood that the steps of method 800 are not required to be performed in the specific sequence in which they are discussed below and, in various embodiments, the steps of method 800 may be performed separately or simultaneously.

In Step 802, each of the shields 94 is circumferentially aligned with a respective one of the probes 54 so that the shields 94 are positioned to protect each of the probes 54 (see FIG. 4). In other words, the shields 94 may be positioned block, deflect, or otherwise obstruct the passage of fluid and/or materials along the fluid flow path 74 which might otherwise strike or become deposited on or inside the probes 54. Each of the shields 94 may be circumferentially aligned with a respective one of the probes 54 by operating the motor 116 to rotate the shield hub 72 relative to the instrumentation hub 70 about the rotational axis 76.

In Step 804, an icing test is performed on the gas turbine engine 10. The icing test may include directing ice, water, sleet, and/or other fluids or foreign matter into one or more fluid flow paths, such as the fluid flow path 74, of the gas turbine engine 10 including, for example, the bypass flow path 24 or the core flow path 26.

In Step 806, the shield hub 72 is rotated relative to the instrumentation hub 70 in a first rotational direction 134 to circumferentially offset each shield 94 from each respective probe 54, as shown in FIG. 9. Each of the shields 94 may be circumferentially offset from each respective probe 54 by operating the motor 116 to rotate the shield hub 72 relative to the instrumentation hub 70 about the rotational axis 76.

In Step 808, the shield hub 72 and the instrumentation hub 70 are rotated together in the first rotational direction 134, as shown in FIG. 10. In Step 806, the shield hub 72 is rotated relative to the instrumentation hub 70 until the shield hub 72 engages the instrumentation hub 70 (e.g., engagement between the cam bolt of the shield hub 72 and the cam slot of the instrumentation hub 70). In this engaged condition, the motor 116 is operated to rotate the shield hub 72 in the first rotational direction 134 which causes the instrumentation hub 70 to rotate in the first rotational direction 134 as well.

In Step 810, the probes 54 measure fluid flow parameters within the fluid flow path 74 as the shield hub 72 and the instrumentation hub 70 rotate together in the first rotational direction 134 about the rotational axis 76. Because the shields 94 are circumferentially offset from the probes 54 and the shield hub 72 and the instrumentation hub 70 rotate together, the probes 54 remain unobstructed by the shields 94 during the measurement of fluid flow parameters. In some embodiments, measurement of fluid flow parameters may additionally or alternatively occur with the shield hub 72 and the instrumentation hub 70 in a stationary (e.g., non-rotational) condition.

In Step 812, the shield hub 72 may be returned to a position in which each of the shields 94 is again circumferentially aligned with a respective one of the probes 54 so that the shields 94 are positioned to protect each of the probes 54 (see FIG. 4), for example, in preparation for further icing tests. The shield hub 72 may be rotated relative to the instrumentation hub 70 in a second rotational direction 138 (see FIG. 4), opposite the first rotational direction 134, so that the shield hub 72 rotates freely of the instrumentation hub 70 (e.g., as the cam bolt 130 of the shield hub 72 travels within the cam slot 128 of the instrumentation hub 70).

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A measurement system for an aircraft gas turbine engine, the measurement system comprising:
    an instrumentation hub including at least one probe, the instrumentation hub rotatable about a rotational axis, the at least one probe including a probe body and at least one sensor inlet portion extending through the probe body, the at least one sensor inlet port configured to receive and convey a fluid for measurement; and
    a shield hub positioned axially adjacent the instrumentation hub, the shield hub including at least one shield which is radially aligned with the at least one probe of the instrumentation hub, the shield hub rotatable about the rotational axis independent of the instrumentation hub.

2. The measurement system of claim 1, further comprising:
    a fixed structure positioned adjacent the instrumentation hub; and
    an anti-rotation device in contact with the instrumentation hub and the fixed structure, the anti-rotation device configured to resist rotation of the instrumentation hub relative to the fixed structure.

3. The measurement system of claim 1, wherein:
    the shield hub includes a first outer radial flowpath surface and the at least one shield extends radially outward from the first outer radial flowpath surface; and the instrumentation hub includes a second outer radial flowpath surface and the at least one probe extends radially outward from the second outer radial flowpath surface.

4. The measurement system of claim 1, wherein the at least one probe includes a plurality of probes circumferentially spaced about the instrumentation hub.

5. The measurement system of claim 1, wherein the shield hub is configured to engage the instrumentation hub so as to selectively effect rotation of the instrumentation hub about the rotational axis.

6. The measurement system of claim 5, wherein the shield hub is rotatable about the rotational axis between a first rotational position relative to the instrumentation hub and a second rotational position relative to the instrumentation hub, wherein:
   in the first rotational position, the shield hub is configured to rotate about the rotational axis independent of the instrumentation hub; and
   in the second rotational position, the shield hub is configured to engage the instrumentation hub such that the shield hub and the instrumentation hub are configured to rotate together about the rotational axis.

7. The measurement system of claim 6, wherein:
   in the first rotational position, the at least one shield is circumferentially aligned with the at least one probe; and
   in the second rotational position, the at least one shield is circumferentially offset from the at least one probe.

8. The measurement system of claim 6, wherein the instrumentation hub includes a partially-circumferential cam slot, wherein the shield hub includes a cam bolt positioned within the cam slot, and wherein the cam bolt is configured to travel circumferentially within the cam slot as the shield hub rotates between the first rotational position and the second rotational position.

9. The measurement system of claim 1, further comprising a motor connected to the shield hub by a shaft disposed about the rotational axis, the motor configured to effect rotation of the shield hub about the rotational axis.

10. The measurement system of claim 9, wherein the shaft and the instrumentation hub are rotatably mounted to a bearing.

11. The measurement system of claim 10, wherein the shaft is rotatably mounted to an inner radial portion of the bearing and the instrumentation hub is rotatably mounted to an outer radial portion of the bearing.

12. A gas turbine engine for an aircraft, the gas turbine engine comprising:
   an annular fluid flow path disposed about a longitudinal centerline of the gas turbine engine;
   an instrumentation hub including at least one probe positioned within the annular fluid flow path, the instrumentation hub rotatable about the longitudinal centerline; and
   a shield hub positioned axially adjacent the instrumentation hub, the shield hub including at least one shield positioned within the annular fluid flow path, the at least one shield radially aligned with the at least one probe of the instrumentation hub, the shield hub rotatable about the longitudinal centerline independent of the instrumentation hub.

13. The gas turbine engine of claim 12, wherein the annular fluid flow path is a core flow path of the gas turbine engine.

14. The gas turbine engine of claim 12, wherein the annular fluid flow path is a bypass flow path of the gas turbine engine.

15. A method for operating a measurement system for an aircraft gas turbine engine, the method comprising:
   providing a shield hub including at least one shield and an instrumentation hub including at least one probe, the shield hub positioned axially adjacent the instrumentation hub with respect to a rotational centerline;
   rotating the shield hub relative to the instrumentation hub in a first rotational direction to circumferentially offset the at least one shield from the at least one probe;
   rotating the shield hub and the instrumentation hub in the first rotational direction; and
   measuring, with the at least one probe, fluid flow parameters of a fluid flow within a fluid flow path of the gas turbine engine while rotating the shield hub and the instrumentation hub in the first rotational direction.

16. The method of claim 15, further comprising performing an icing test with the at least one shield circumferentially aligned with the at least one probe, prior to the step of rotating the shield hub relative to the instrumentation hub in the first rotational direction.

17. The method of claim 15, further comprising rotating the shield hub relative to instrumentation hub in a second rotational direction, opposite the first rotational direction, until the at least one shield is circumferentially aligned with the at least one prior, subsequent to the step of rotating the shield hub and the instrumentation hub in the first rotational direction to measure fluid flow within a fluid flow path of the gas turbine engine.

18. The method of claim 15, wherein the step of rotating the shield hub relative to the instrumentation hub in a first rotational direction includes rotating the shield hub with a motor connected to the shield hub by a shaft.

19. The method of claim 18, wherein the shaft and the instrumentation hub are rotatably mounted to a bearing, wherein the shaft is rotatably mounted to an inner radial side of the bearing, and wherein the instrumentation hub is rotatably mounted to an outer radial side of the bearing.

* * * * *